(12) United States Patent
Pramod et al.

(10) Patent No.: US 10,833,620 B2
(45) Date of Patent: Nov. 10, 2020

(54) DYNAMIC ESTIMATION OF SUPPLY CURRENT FOR ELECTRIC MOTOR DRIVE

(71) Applicant: STEERING SOLUTIONS IP HOLDING CORPORATION, Saginaw, MI (US)

(72) Inventors: Prerit Pramod, Saginaw, MI (US); Aparna Saha, Saginaw, MI (US); Infane O. Lowe, Flint, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 6 days.

(21) Appl. No.: 16/153,339

(22) Filed: Oct. 5, 2018

(65) Prior Publication Data

US 2020/0112280 A1    Apr. 9, 2020

(51) Int. Cl.
*H02P 27/06* (2006.01)
*H02P 25/022* (2016.01)
*H02P 21/14* (2016.01)
*B62D 5/04* (2006.01)

(52) U.S. Cl.
CPC ............ *H02P 27/06* (2013.01); *B62D 5/0409* (2013.01); *B62D 5/0463* (2013.01); *H02P 21/14* (2013.01); *H02P 25/022* (2013.01)

(58) Field of Classification Search
CPC ........ H02P 27/06; H02P 21/14; H02P 25/022; B62D 5/0409
See application file for complete search history.

(56) References Cited

U.S. PATENT DOCUMENTS

| | | | | | |
|---|---|---|---|---|---|
| 6,166,929 | A | * | 12/2000 | Ma ...................... | H02M 5/4505 363/37 |
| 7,276,877 | B2 | * | 10/2007 | Qiu ...................... | G05B 13/048 318/453 |
| 2008/0265808 | A1 | * | 10/2008 | Sparey .................. | H02P 6/182 318/139 |
| 2013/0033907 | A1 | * | 2/2013 | Zhou ...................... | H02M 1/12 363/37 |
| 2013/0049918 | A1 | * | 2/2013 | Fu .......................... | H01F 3/12 336/220 |

* cited by examiner

*Primary Examiner* — Eduardo Colon Santana
*Assistant Examiner* — Said Bouziane
(74) *Attorney, Agent, or Firm* — Dickinson Wright PLLC

(57) ABSTRACT

According to one or more embodiments of the technical solutions described herein, an example method includes determining an input voltage ($V_{inv}$) of an inverter in a power circuit. The method further includes measuring an input current ($I_i$) of the inverter. The method further includes estimating a power supply current from a power supply of the power circuit based on the input voltage and the input current using a state observer and a plant model of the power circuit, the power supply current estimated at a non-steady state. The method further includes performing an active power management of a motor that receives electric power via the inverter.

16 Claims, 7 Drawing Sheets

DYNAMIC ESTIMATION OF SUPPLY CURRENT FOR ELECTRIC MOTOR DRIVE

BACKGROUND

Electric systems that utilize electric motor drive systems, such as electric power steering (EPS) systems, pumps, washing machines, dryers, industrial equipment, and the like, commonly employ advanced algorithms such as active power management, which pertains to limiting the supply (and regenerative current) of the systems in real-time on continuously changing limit demands. Such techniques allow for optimal use of the power supply, such as a battery. Active power management further improves performance of the overall electric system as well as an operator's comfort. For example, in cases where an operator is continuously operating the electric system, such as in case of a driver using an EPS in a vehicle, the active power management helps the overall vehicle performance and the driver's comfort.

SUMMARY

According to one or more embodiments of the technical solutions described herein, an example method includes determining an input voltage ($V_{inv}$) of an inverter in a power circuit. The method further includes measuring an input current ($I_i$) of the inverter. The method further includes estimating a power supply current from a power supply of the power circuit based on the input voltage and the input current using a state observer and a plant model of the power circuit, the power supply current estimated at a non-steady state. The method further includes performing an active power management of a motor that receives electric power via the inverter.

According to one or more embodiments, an apparatus includes a power supply, an inverter, a power input circuit, and a processor that estimates a power supply current from the power supply. The estimation is performed using a method that includes determining an input voltage ($V_{inv}$) of an inverter in a power circuit. The method further includes measuring an input current ($I_i$) of the inverter. The method further includes estimating a power supply current from a power supply of the power circuit based on the input voltage and the input current using a state observer and a plant model of the power circuit, the power supply current estimated at a non-steady state. The method further includes performing an active power management of a motor that receives electric power via the inverter.

According to one or more embodiments, a steering system includes an inverter, a power input circuit, and a processor that estimates a power supply current from the power supply. The estimation is performed using a method that includes determining an input voltage ($V_{inv}$) of an inverter in a power circuit. The method further includes measuring an input current ($I_i$) of the inverter. The method further includes estimating a power supply current from a power supply of the power circuit based on the input voltage and the input current using a state observer and a plant model of the power circuit, the power supply current estimated at a non-steady state. The method further includes performing an active power management of a motor that receives electric power via the inverter.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Typically, in most existing systems, active power management is performed using steady-state estimation of a supply current, which is the electric current received from a power supply providing electric power to an electric system. When the current at a point in the electric circuit of the system is substantially constant (does not change with time), it is termed steady-state current. In the steady-state, the current (or charge) flowing into any point in the electric circuit of the system is substantially equal to the current (or charge) flowing out of that point. Typically, an observer (state estimator) can be used to estimate the steady-state supply current.

For performing active power management, at least in some cases, not only is the steady-state power or current required to be limited to a specified value, but the dynamics of the supply current are also required to be constrained or bounded. The 'dynamics of the supply current' as referred to herein include the supply current measurements between two consecutive steady-state measurements. Measuring the supply current in such a dynamic state is a technical challenge, because in such cases, it is desirable to obtain an estimate of the supply current in real-time. Existing solutions to obtain such dynamic measurement use a current sensor for measuring the supply current in real time. While the direct measurement may be desirable from an accuracy standpoint, it adds cost to the electric system.

The technical solutions described herein address the technical challenge by providing an observer based estimation of the supply current, which can estimate the supply current even in dynamic-state (non-steady-state), without additional cost of a current sensor.

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
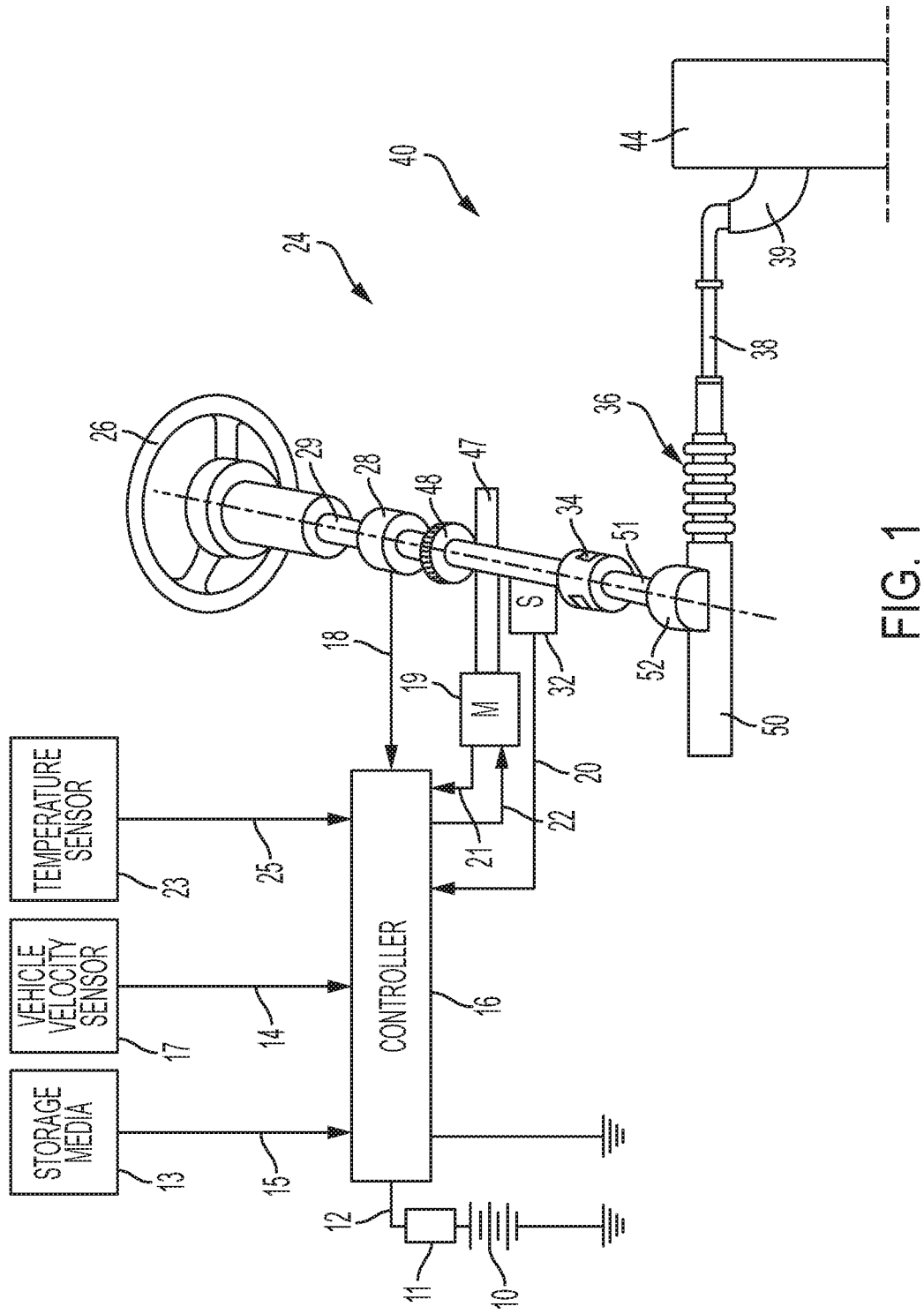
FIG. 1 is an exemplary embodiment of an EPS system according to one or more embodiments.

Referring now to the Figures, where the technical solutions will be described with reference to specific embodiments, without limiting same, FIG. 1 is an exemplary embodiment of an EPS 40 suitable for implementation of the disclosed embodiments. It should be noted that although the technical solutions of dynamic estimation of supply current for electric motor drive systems are described herein with reference to the EPS 40, the technical solutions can be used in any other electric system that uses an electric motor drive, and are not limited to an EPS.

In FIG. 1, the steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor, and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter 11, which may optionally be incorporated with controller 16. When the voltage is applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. It should be noted that unless specifically stated otherwise, the one or more operations, features, and/or methods described herein are implemented by the controller 16 via one or more of the other components of the EPS 40. Additional features of controller 16 and certain processes therein are discussed at a later point herein.

In general, the closed-loop dynamics of the supply current in the EPS system 40 are dependent not only on the EPS system 40 but also by the dynamics of the vehicle battery 10 as well as the different components drawing power from the vehicle energy network, for example, an active braking system, a media system, air conditioning system, and various other components in the vehicle. From the standpoint of the EPS system 40, the supply current at the component input may be obtained by utilizing a model of a power input circuit, along with a measurement of an input voltage. The power input circuit includes a common-mode choke inductor, an RC type filter and other such measurement and protection circuitry. Accordingly, the technical solutions described herein provide a dynamic model of the power input circuit, and the observer that is used to estimate the supply current therefrom. It should be noted that in embodiments of the observer described herein, the models for the power input circuits that are described can be extended/replaced with different models specific to the electric machine for which the supply current is being estimated. Accordingly, the observer based dynamic supply current estimation described herein is not limited to the power input circuit models described herein, which are just a few examples.

Further, in the one or more embodiments described herein the dynamically estimated supply current is used for performing one or more operations of the EPS system 40. However, in other examples the estimated supply current may have other applications than those described herein, based on the type of the electric system. Accordingly, the technical solutions described herein are not limited to using the estimated dynamic supply current only in the context of EPS systems.

Figure 2:
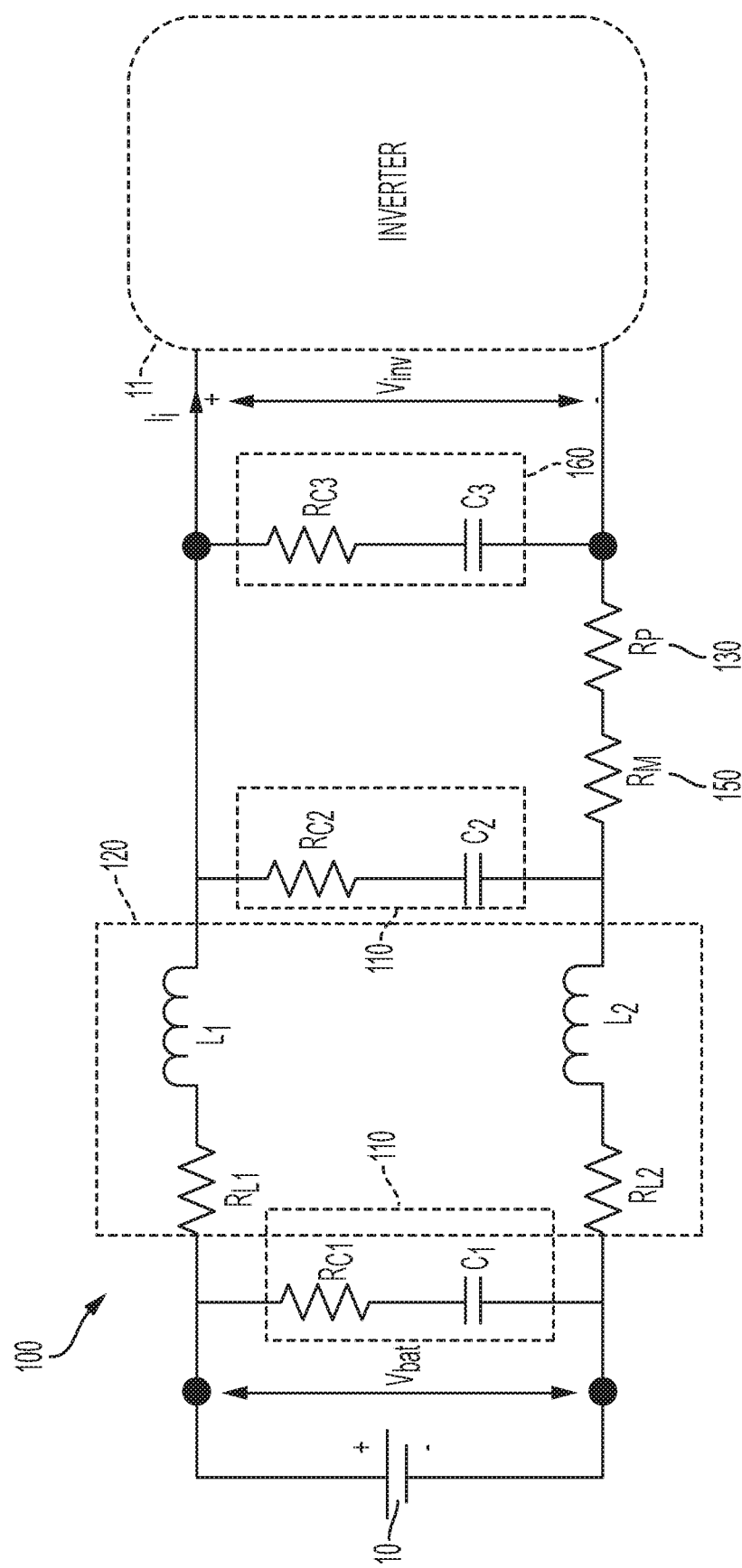
FIG. 2 is a block diagram of a power circuit according to one or more embodiments.

FIG. 2 is a block diagram of a power input circuit according to one or more embodiments. The power input circuit 100 includes several different hardware components for different purposes, including filtering signals used by the microcontroller, voltage regulation, circuitry protection etc. The power input circuit 100 filters out unwanted signal and eliminates high frequency noise from the power supply 10, e.g. battery voltage ($V_{bat}$), to provide the inverter voltage ($V_{inv}$) at the input of the inverter 11. In FIG. 2, only a few of these components are shown. For example, the components depicted are those used for estimating the supply current dynamics according to one or more embodiments. While the actual power input circuit 100 is much more complex than what is depicted, the impact of the different components that are not included in FIG. 2 have little to no impact on the supply current dynamics, and hence not used in the model.

As depicted, to convert the battery voltage $V_{bat}$ to the inverter input voltage $V_{inv}$ the components shown include input filtering capacitors ($C_1$ and $C_2$) 110, a common mode choke 120, a reverse battery protection field effect transistor (FET) 130, a current measurement shunt 150, and a bulk capacitor 160. It should be noted that in case of inductors and capacitors, the inherent resistors are also depicted.

An analytical model of the power circuit 100 that includes at least the above dynamic elements is complex because the model includes several states (current and voltages across the dynamic elements). Using such an analytical model for computing one or more value estimates is impractical, especially in real-time applications. For example, an expression for an inverter input voltage $V_{inv}$ for the power circuit 100 in terms of the battery voltage $V_{bat}$ and inverter current ($I_i$) using the analytical model is given below.

$$V_{inv} = H_1 V_{bat} + H_2 I_i \qquad \text{Eq. (1)}$$

where $H_1$ is the transfer function that relates inverter input voltage with the battery voltage and transfer function $H_2$ relates inverter input voltage and inverter current. The voltage transfer function ($H_1$) for the power input circuit 100, in one or more examples, is given below.

$$H_1 = \frac{\frac{sR_{C_3}C_3+1}{sC_3}}{\left[(R_{L_1}+s(L_1-M)+R_{L_2}+s(L_2-M))\left(1+\frac{R_M+\frac{sR_{C_3}C_3+1}{sC_3}}{\frac{sR_{C_2}C_2+1}{sC_2}}\right)+\left(R_M+\frac{sR_{C_3}C_3+1}{sC_3}\right)\right]} \qquad \text{Eq. (2)}$$

For designing and implementing a practical supply current observer, the complexity of the model needs to be simplified. To that end, a simplified model is determined. Determining the simplified model includes a study of (one of) the frequency responses of the EPS system 40 in order to understand the impact of the different components on the system dynamics. The frequency responses shown below compare the complex system frequency response to different responses generated by removing one component at a time.

Figure 3:
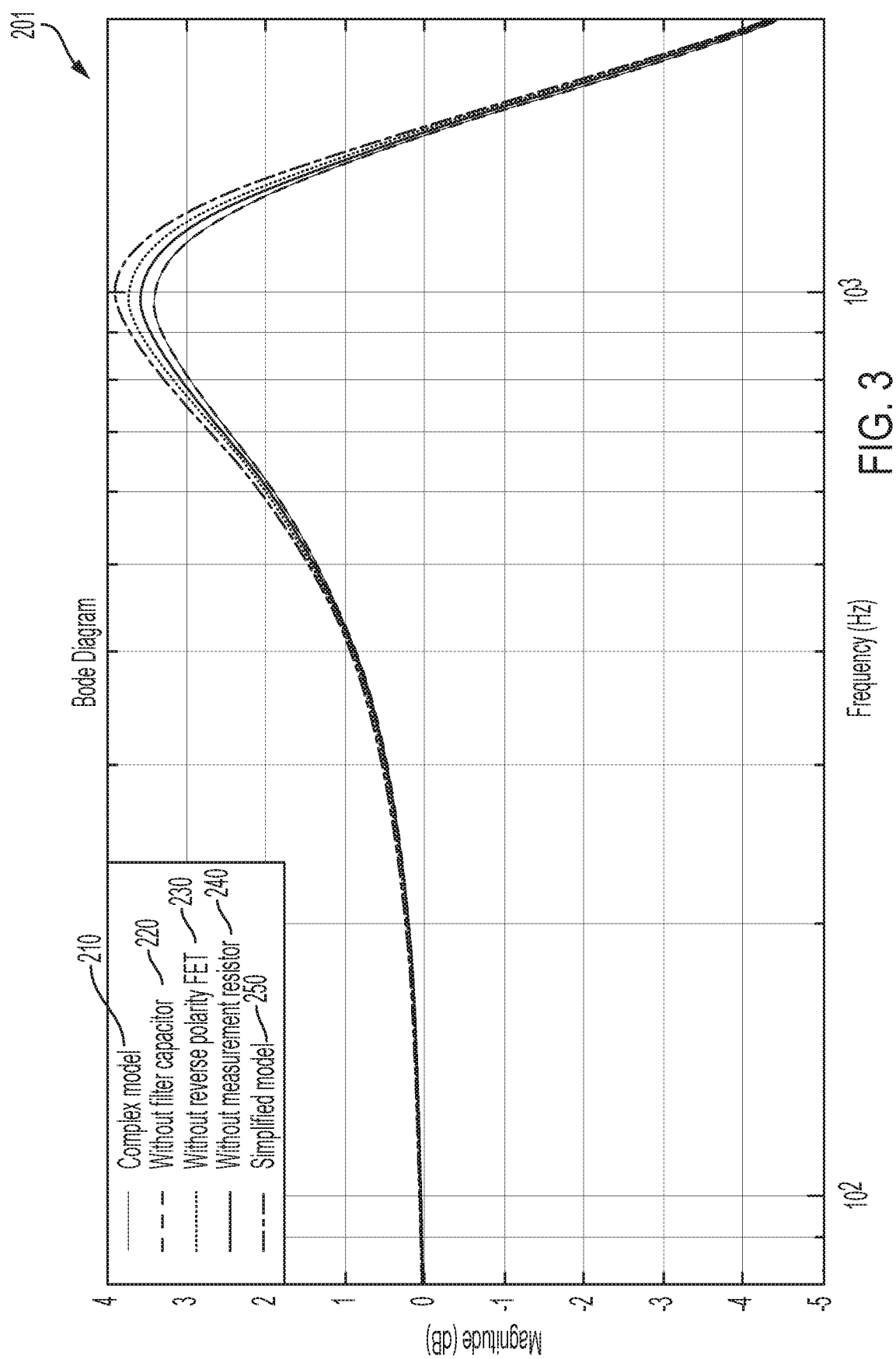
FIG. 3 depicts a magnitude plot of one or more transfer functions of a power circuit according to one or more embodiments.

FIG. 3 depicts a magnitude plot 201 of one or more transfer functions of the power input circuit converting the $V_{bat}$ to $V_{inv}$, according to one or more embodiments. For example, a frequency response plot 210 is shown when the power input circuit includes all of the components from FIG. 2. The frequency response plot 220 is when the filter capacitors 110 are not included in the power input circuit.

The frequency response plot 230 is when the reverse battery protection FET 130 is not included in the power input circuit. The frequency response plot 240 is when the current measurement shunt 150 is not included in the power input circuit 100. The frequency response plot 250 is when multiple components such as filter capacitors 110, reverse battery protection FET 130 and current measurement shunt 150 are not included in the power input circuit.

As seen from the magnitude plot 201, all the components except for the common mode choke 120, bulk capacitor 160, and the different resistances lumped into equivalent series and parallel resistances, have virtually no impact on the frequency responses, and hence, on the dynamics of the system. Accordingly, the technical solutions herein simplify the model of the power input circuit to contain only the choke 120 and the bulk capacitor 160 to model the dynamics of the power input circuit. In one or more examples, the model also includes the different resistances of the power input circuit lumped together.

Figure 4:
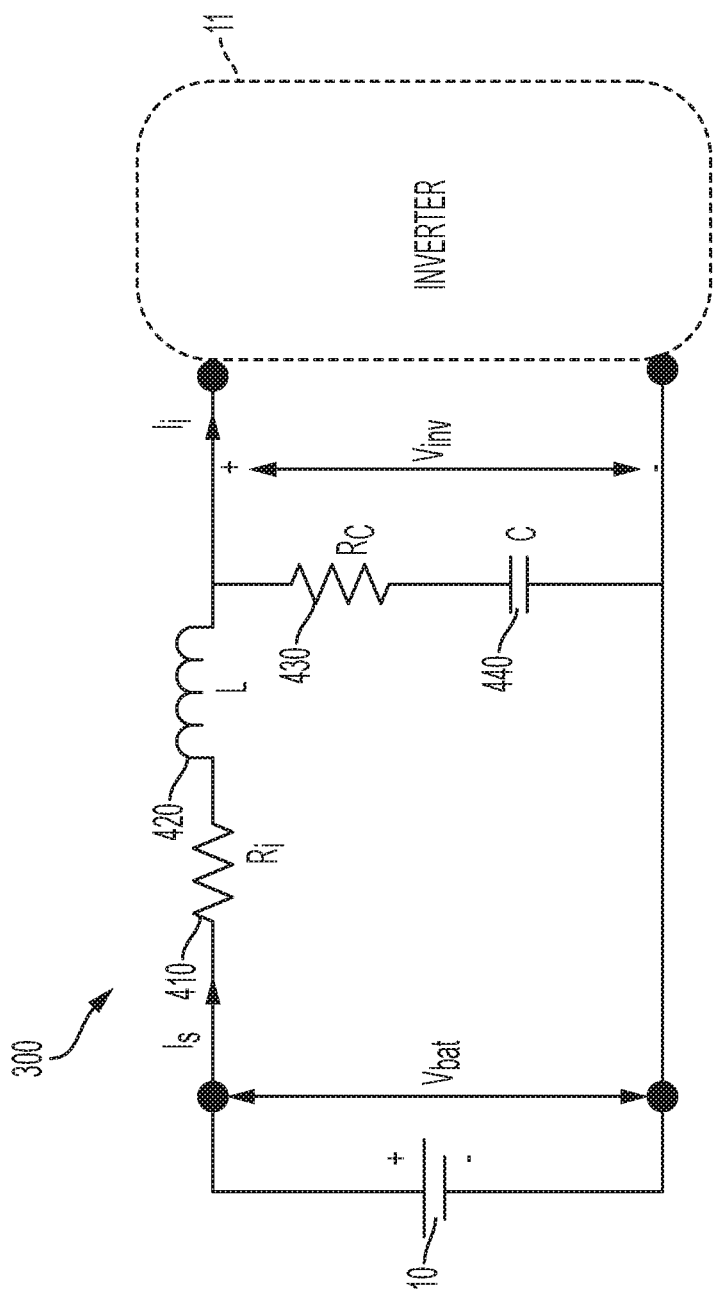
FIG. 4 depicts a simplified model of the power circuit according to one or more embodiments.

FIG. 4 depicts a simplified model of the power input circuit according to one or more embodiments. Here, a first resistor ($R_i$) 410 is used to replace a resistance of the common mode choke 120 and along with some trace resistances. The first resistor ($R_i$) 410 can have a value that is computed based on the one or more resistance values of the common mode choke 120 being in series, in parallel, or a combination thereof. For example, in the power input circuit 100 depicted in FIG. 2, the resistors ($R_{L1}$ and $R_{L2}$) of the common mode choke 120 are considered to be in series.

In a similar manner a first inductance (L) 420 can have a value that is computed based on the one or more inductance values of the common mode choke 120. The value for the first inductance 420 can be computed based on the inductances in the common mode choke 120 being in parallel, series, or a combination thereof.

Further, a second resistance value ($R_C$) 430 is determined based on a resistance of the bulk capacitor 160. A capacitance (C) 440 is determined based on a capacitance of the bulk capacitor 160.

As can be seen from a comparison of the power circuits 300 (FIG. 4) and the power input circuit (FIG. 2), the simplified model reduces the complexity of the model to be used for estimating the supply current by eliminating, from consideration, the components other than the bulk capacitor 160 and the common mode choke 120 of the power input circuit. In other words, the effects of the input filtering capacitors ($C_1$ and $C_2$) 110, the reverse battery protection FET 130, and the current measurement shunt 150 are not considered when computing the estimated supply current ($I_s$).

Similarly, inverter input voltage $V_{inv}$ for the power input circuit 300 of the simplified system can be also expressed in terms of the battery voltage $V_{bat}$ and inverter current ($I_i$) as below.

$$V_{inv} = H_3 V_{bat} + H_4 I_i \quad \text{Eq. (3)}$$

Here $H_3$ is the transfer function that relates inverter input voltage with the battery voltage and transfer function $H_4$ relates inverter input voltage and inverter current of the simplified model power input circuit 300. The expression for the voltage transfer function ($H_3$) and for the transfer function $H_4$ of the power input circuit 300, according to one or more examples, are given below.

$$H_3 = \frac{sR_cC + 1}{(sL + R_c + R_i)sC + 1} \quad \text{Eq. (4)}$$

$$H_4 = -\frac{(sR_cC + 1)(sL + R_i)}{(sL + R_c + R_i)sC + 1} \quad \text{Eq. (5)}$$

The advantages of using the simplified model include being able to compute the estimated supply current even for dynamics in substantially real time and using fewer computing resources compared to the model in Eq (1). An optimal model is obtained when the signal estimate computed by using the simplified model (Eq. (3)) is substantially the same as that from the complex model (Eq. (1)). The transfer function from the input voltage $V_{bat}$ to estimate the supply current $I_s$ for the simplified model of the power input circuit 300 is shown below.

$$I_s = \frac{sC}{(sL + R_c + R_i)sC + 1} V_{bat} + \frac{sR_cC + 1}{(sL + R_c + R_i)sC + 1} I_i \quad \text{Eq. (6)}$$

However, the expression for the supply current estimation in Eq. (6) as a function of input battery voltage ($V_{bat}$) and inverter current ($I_i$) is one of the arrangements. The supply current can be also estimated in terms of any of the two voltages and/or currents of the simplified power input circuit 300.

Here, s represents a derivative (Laplacian) term. The derivative term is employed for computing the supply current. In one or more examples, the supply current computation may be implemented using continuous time techniques and then discretized. Alternatively, or in addition, the supply current computation can be directly designed in the discrete domain. The continuous time derivative may be implemented in discrete time (z domain), for example, by using Tustin approximation (or other techniques) as follows.

$$s = \frac{2}{T_s} \frac{1 - z^{-1}}{1 + z^{-1}} \quad \text{Eq. (7)}$$

Here $T_s$ is the discrete control loop sampling time. It should be noted that the approximate derivative may be implemented in other ways, including by changing the continuous time approximation, by using different discrete time approximations of the continuous time equivalents, or by directly designing the derivative term in the discrete domain.

An estimator of the supply current ($I_s$) may be designed in multiple ways. For example, in one or more examples, the transfer function is directly inverted resulting in a dynamic feedforward estimate. A second method is to use a closed-loop state estimator. Regardless of how the estimation is performed, using feedforward estimation or using a closed-loop estimation, a common framework is used in which a feedback portion of the state estimator is set to zero resulting in the feedforward estimator. For either ways of estimation, the plant model of the power input circuit 100 in state space is the basis, as shown below.

$$\left. \begin{array}{l} \dot{x} = Ax + bu + Ed \\ y = Fx + Du \end{array} \right\} \quad \text{Eq. (8a)}$$

where $\dot{x}$ is a state vector including values of the current state of the power input circuit, u is an input vector including measurable (and controllable) inputs to the power input circuit, and d is a disturbance vector including measurable values that are not controllable, and typically non-linear in nature. Further, y is an output vector that is based on the current state $\dot{x}$ of the power input circuit. A, B, F, D, and E, are configurable matrices which are setup to model the power input circuit. In one or more examples, the disturbance is negligible and can be ignored for calculation purposes. Accordingly, the matrices A, B, F, and E can be configured as follows to compute the estimated supply current ($I_s$).

$$\begin{bmatrix} \dot{I}_s \\ \dot{V}_{inv} \end{bmatrix} = \begin{bmatrix} -\dfrac{R_i + R_c}{L} & -\dfrac{1}{L} \\ \dfrac{1}{C} & 0 \end{bmatrix} \begin{bmatrix} I_s \\ V_{inv} \end{bmatrix} + \begin{bmatrix} \dfrac{1}{L} & \dfrac{R_c}{L} \\ 0 & -\dfrac{1}{C} \end{bmatrix} \begin{bmatrix} V_{bat} \\ I_i \end{bmatrix} \quad \text{Eq. (8b)}$$

$$[V_{inv}] = [R_c \quad 1] \begin{bmatrix} I_s \\ V_{inv} \end{bmatrix} + [0 \quad -R_c] \begin{bmatrix} V_{bat} \\ I_i \end{bmatrix}$$

In one or more examples, the matrices A, B, F, and E may be preconfigured. Because the plant's current outputs and its future state are both determined based on the current states and the current inputs, the output of the plant, y(k) is used to steer the state of the state observer.

In this case, the inverter current ($I_i$) is modeled as an input to the EPS system 40 for the purposes of plant modeling for observer design. The inverter current may be typically obtained by dividing the motor electrical power draw by the inverter voltage. The observer design may be performed using the state estimation techniques which may be linear or non-linear.

Figure 5:
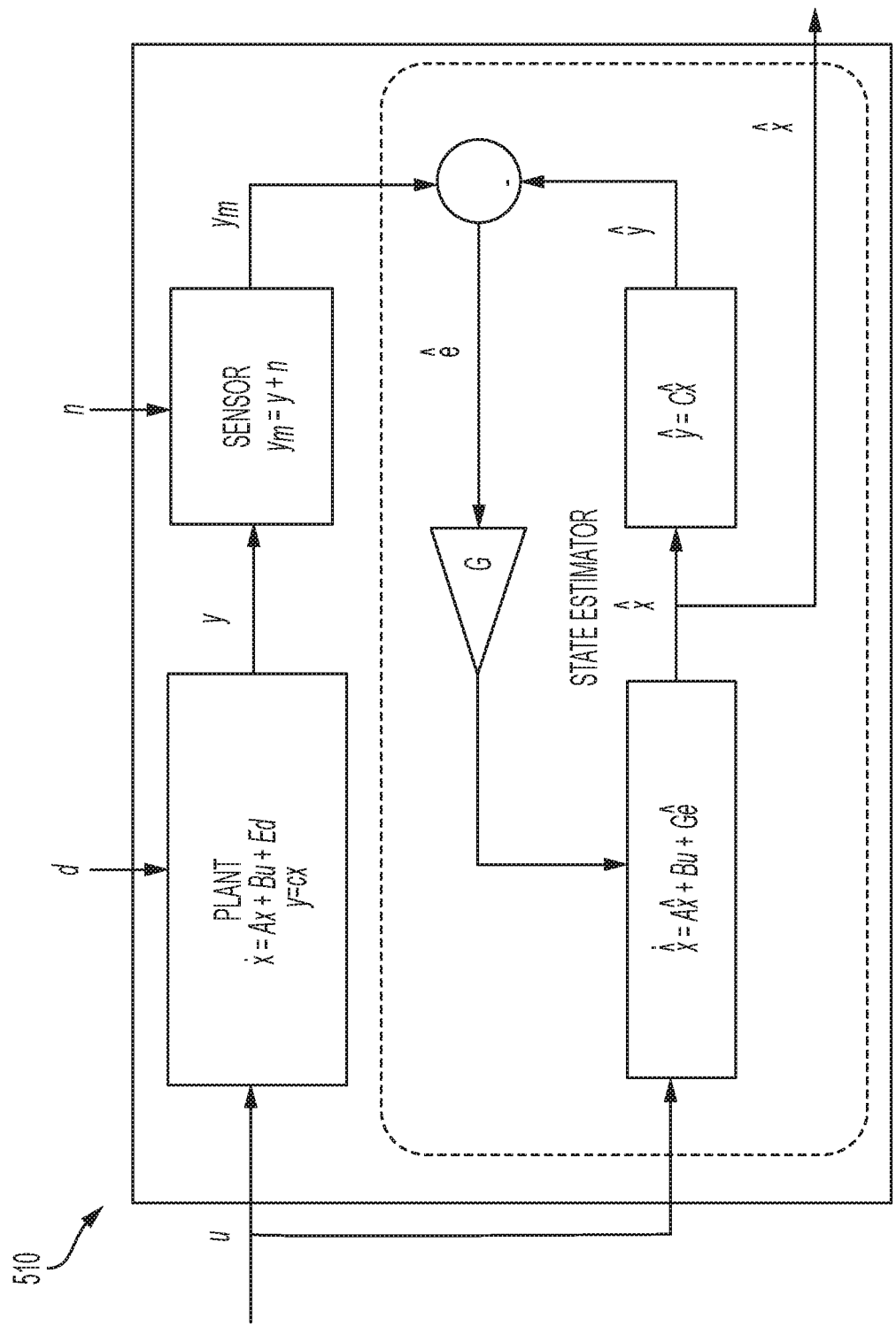
FIG. 5 depicts a structure and a dataflow for a state observer, according to one or more embodiments.

FIG. 5 depicts a structure and a dataflow for a state observer, according to one or more embodiments. The state observer 510 operates such that $\hat{\dot{x}} = A\hat{x} + Bu + G(y - \hat{y})$, where G is an observer gain matrix with configurable parameters, and (ym−$\hat{y}$) represents an error $\hat{e}$, which is a difference between the supply current and estimate $\hat{y}$ of the supply current from the state observer 510. The parameters in G are tuned using tuning techniques such as linear quadratic Gaussian (LQG), pole placement, and the like or a combination thereof.

Thus, the state observer 510 is a closed-loop observer that computes an estimate $\hat{x}(k)$ at each time k of the state x(k), by measuring the output y(k) and input u(k). For example, the state observer 510 employs the observer gain matrix G such that on receiving successive measured values of the plant's inputs and outputs, the model's state converges to that of the plant (that is, magnitude of $\hat{e}$ is below a predetermined threshold such as 0.1. 0.001, or the like; substantially 0). For example, the output of the state observer 510 $\hat{y}$ is subtracted from the output y of the plant and then multiplied by the gain matrix G. The result is then added to compute the estimate $\hat{x}$.

It should be noted that other types of state observers may also be used. For example, a linear state estimator, such as a Luenberger observer, Kalman filter, and the like may be used. An example linear state estimator is:

$$\hat{\dot{x}} = A\hat{x} + Bu + G(y - \hat{y}) = (A - GF)\hat{x} + (B - GD)u + Gy$$

Alternatively, or in addition, the state observer 510 may use a discrete-time (digital) implementation, or any other type of observer model to estimate the inverter voltage.

The observer gain matrix G may be tuned using any of the techniques such as pole placement, linear quadratic estimation etc. Further, the discretization of the continuous time observer described above may also be performed for the purposes of digital implementation within a microcontroller. Any of the known discretization techniques and direct discrete time observer designs can be used for the digital implementation.

The observer can be validated experimentally by comparing the supply current estimate from the dynamic feedforward observer and the measured supply current. Such validity experiments performed have shown that the simplified plant model of the power input circuit described herein has substantially the same accuracy in capturing the dynamic variation of the supply current as the more complex version.

Figure 6:
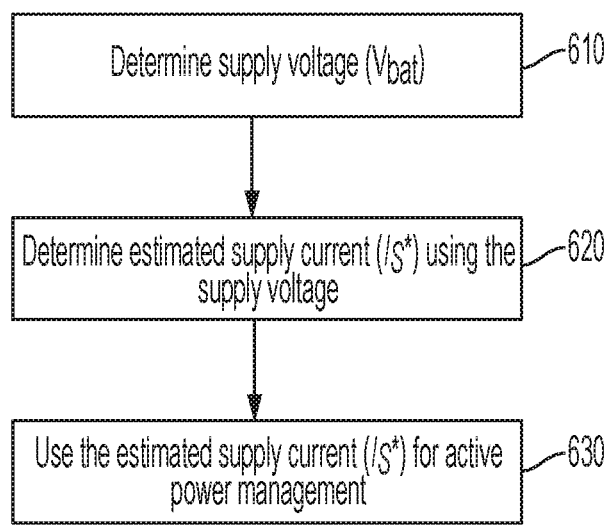
FIG. 6 depicts a flowchart for an example method for estimating the supply current and performing one or more operations using the estimated supply current according to one or more embodiments.

FIG. 6 depicts a flowchart for an example method for estimating the supply current and performing one or more operations using the estimated supply current according to one or more embodiments. The method includes determining the supply voltage ($V_{bat}$), at 610. Further, the method includes determining an estimated supply current ($I_s$) using the supply voltage and a model of the power input circuit, at 620. For example, the estimated supply current is computed according to Eq. (6).

The method further includes using the estimated supply current ($I_s$) for active power management in the EPS system 40, at 630. In one or more examples, the active power management includes adjusting a current/torque command being provided to the motor 19 of the EPS system 40 to adjust an amount of torque being generated by the motor. In one or more examples, the amount of torque may be an assist torque being provided to an operator by the EPS system 40.

Figure 7:
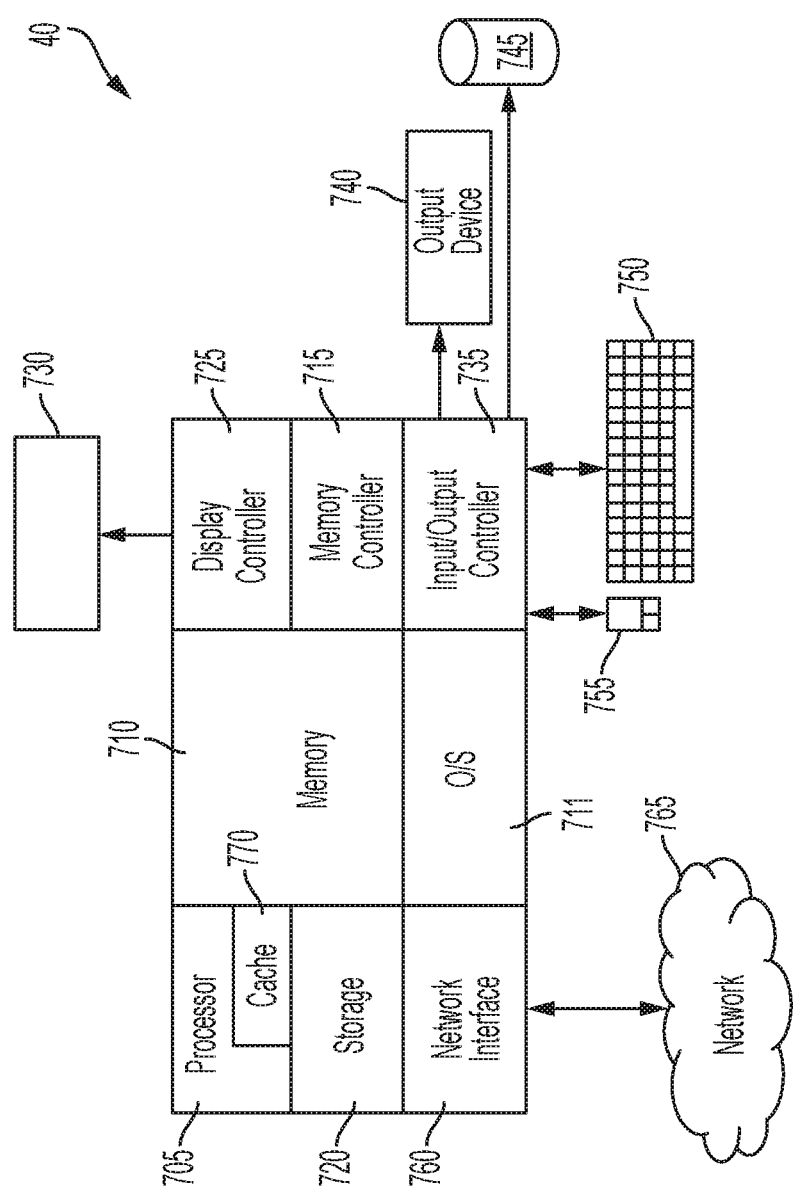
FIG. 7 illustrates an example of a control module of a motor control system according to one or more embodiments.

FIG. 7 illustrates an example of the control module 40 of a motor control system according to one or more embodiments. The control module 40 includes hardware, such as electronic circuitry, for example a microprocessor, an electronic control unit (ECU), and the like. In one or more examples, the control module 40 implements the embodiments described herein.

The control module 40 includes, among other components, a processor 705, memory 710 coupled to a memory controller 715, and one or more input devices 745 and/or output devices 740, such as peripheral or control devices that are communicatively coupled via a local input-output (I/O) controller 735. These devices 740 and 745 may include, for example, battery sensors, position sensors, indicator/identification lights and the like. Input devices such as a conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 740, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 710. The processor 705 may be a custom made or commercially available processor, a central processing unit (CPU), an auxiliary processor among several processors associated with the control module 40, a semiconductor based microprocessor (in the form of a microchip or chip set), a macroprocessor, or other device for executing instructions. The processor 705 includes a cache 770, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 770 may be organized as a hierarchy of more cache levels (L1, L2, and so on).

The memory 710 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 710 may incorporate electronic, magnetic, optical, or other types of storage media.

The instructions in memory 710 may include one or more separate programs, each of which comprises an ordered listing of executable instructions for implementing logical functions. In the example of FIG. 7, the instructions in the memory 710 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 720, which may be a storage device such as a hard disk drive or solid state drive. The stored instructions in memory 710 or in storage 720 may include those enabling the processor to execute one or more aspects of the systems and methods described herein.

The control module 40 may further include a display controller 725 coupled to a user interface or display 730. In some embodiments, the display 730 may be an LCD screen. In other embodiments, the display 730 may include a plurality of LED status lights. In some embodiments, the control module 40 may further include a network interface 760 for coupling to a network 765. The network 765 may be a CAN-based network, or an IP-based network for communication between the control module 40 and other components of the vehicle 10. The network 765 transmits and receives data between the control module 40 and external components. In one or more examples, the control module 40 implements the technical solutions described herein.

The technical solutions described herein accordingly facilitate estimation of the supply (input) current of electric motor drive systems using a dynamic model of the power circuit, a measurement of the supply (input) voltage, a inverter input voltage, and an estimate of the power draw of the motor control system (starting from the inverter input). The technical solutions described herein facilitate estimation of the supply current dynamics (not steady-state only). Such estimation of the current dynamics is critical for control design intended to control system under rapid transients.

By facilitating estimation of the supply current, the technical solutions described herein eliminate need for battery current measurement sensor which provides significant cost savings. Such sensors can include a shunt resistor, an amplifier, and surrounding circuitry for input to a microcontroller, which too are eliminated.

The technical solutions described herein further facilitate estimation of DC link voltage by using an additional state in estimator, which combines advantages of estimation and measurement (especially with Kalman filter implementation). The technical solutions further facilitate power flow dynamics to be estimated, which can be useful for control schemes requiring power flow control (closed- or open-loop estimation).

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the present disclosure, it is claimed:

1. A method comprising:
    determining an input voltage ($V_{inv}$) of an inverter in a power circuit;
    measuring an input current ($I_i$) of the inverter;
    estimating a power supply current from a power supply of the power circuit based on the input voltage and the input current using a closed-loop state observer with tunable parameters and a plant model of the power circuit, the power supply current estimated in real-time in a dynamic state, wherein the power circuit includes at least a bulk capacitor, a common mode choke, and one or more electrical traces, and wherein the plant model includes a representation of at least one of an inductance, a resistance, and a capacitance of the bulk capacitor, the common mode choke, and the one or more electrical traces of the power circuit; and
    performing an active power management of a motor that receives electric power via the inverter.

2. The method of claim 1, wherein resistance values of the common mode choke are combined to form a single resistance value of the common mode choke in the plant model, wherein inductance values of the common mode choke are combined to form a single inductance value of the common mode choke in the plant model, and wherein the plant model of the power circuit further comprises the bulk capacitor.

3. The method of claim 1, wherein a transfer function of the plant model of the power circuit is represented as $$I_s = \frac{sC}{(sL + R_C + R_i)sC + 1} V_{bat} + \frac{sR_CC + 1}{(sL + R_C + R_i)sC + 1} I_i,$$

where $I_s$ is the power supply current, C is a capacitance of the bulk capacitor, L is an inductance of the common mode choke, $R_C$ is a resistance of the bulk capacitor, $R_i$ is a resistance of the common mode choke, s is a derivative term, and $V_{bat}$ is a battery voltage.

4. The method of claim 1, wherein the power supply current is a total power supply current estimated at a time k.

5. The method of claim 4, wherein the power supply current is estimated at time k using a linear state estimator of the closed-loop state observer.

6. An apparatus comprising:
    a power supply;
    an inverter;
    a power input circuit; and
    a processor configured to estimate a power supply current from the power supply, the estimation comprising:
        determining an input voltage ($V_{inv}$) of the inverter;
        measuring an input current ($I_i$) of the inverter;
        estimating the power supply current based on the input voltage and the input current using a state observer and a plant model of the power input circuit, the power supply current estimated in real-time in a dynamic state, wherein the power circuit includes at least a bulk capacitor, a common mode choke, and one or more electrical traces, and wherein the plant model includes a representation of at least one of an inductance, a resistance, and a capacitance of the bulk capacitor, the common mode choke, and the one or more electrical traces of the power circuit; and
        performing an active power management of a motor that receives electric power via the inverter.

7. The apparatus of claim 6, wherein resistance values of the common mode choke are combined to form a single resistance value of the common mode choke in the plant model.

8. The apparatus of claim 6, wherein a transfer function of the plant model of the power input circuit is represented as $$I_s = \frac{sC}{(sL + R_C + R_i)sC + 1} V_{bat} + \frac{sR_CC + 1}{(sL + R_C + R_i)sC + 1} I_i,$$

where $I_s$ is the power supply current, C is a capacitance of the bulk capacitor, L is an inductance of the common mode choke, $R_C$ is a resistance of the bulk capacitor, $R_i$ is a resistance of the common mode choke, s is a derivative term, and $V_{bat}$ is a battery voltage.

9. The apparatus of claim 6, wherein the input voltage of the inverter is determined based on a power supply voltage ($V_{bat}$) and the input current ($I_i$).

10. The apparatus of claim 6, wherein the power supply current is a total power supply current estimated at a time k.

11. The apparatus of claim 10, wherein the power supply current is estimated at time k using a linear state estimator of the state observer.

12. A steering system, comprising:
    an inverter;
    a power input circuit; and
    a processor configured to estimate a power supply current from a power supply, the estimation comprising:
        determining an input voltage ($V_{inv}$) of the inverter;
        measuring an input current ($I_i$) of the inverter;
        estimating the power supply current based on the input voltage and the input current using a closed-loop state observer with tunable parameters and a plant model of the power input circuit, the power supply current estimated in real-time in a dynamic state, wherein the power circuit includes at least a bulk capacitor, a common mode choke, and one or more electrical traces, and wherein the plant model includes a representation of at least one of an inductance, a resistance, and a capacitance of the bulk capacitor, the common mode choke, and the one or more electrical traces of the power circuit; and
        performing an active power management of a motor that receives electric power via the inverter.

13. The steering system of claim 12, wherein resistance values of the common mode choke are combined to form a single resistance value of the common mode choke in the plant model, and wherein inductance values of the common mode choke are combined to form a single inductance value of the common mode choke in the plant model.

14. The steering system of claim 12, wherein a transfer function of the plant model of the power input circuit is represented as $$I_s = \frac{sC}{(sL + R_C + R_i)sC + 1} V_{bat} + \frac{sR_CC + 1}{(sL + R_C + R_i)sC + 1} I_i,$$

where $I_s$ is the power supply current, C is a capacitance of the bulk capacitor, L is an inductance of the common mode choke, $R_C$ is a resistance of the bulk capacitor, $R_i$ is a resistance of the common mode choke, s is a derivative term, and $V_{bat}$ is a battery voltage.

15. The steering system of claim 12, wherein the power supply current is a total power supply current estimated at a time k.

16. The steering system of claim 15, wherein the power supply current is estimated at time k using a linear state estimator of the closed-loop state observer.

* * * * *